July 31, 1923.
P. G. JACOBSON
INDICATING DEVICE
Filed Aug. 30, 1922
1,463,321
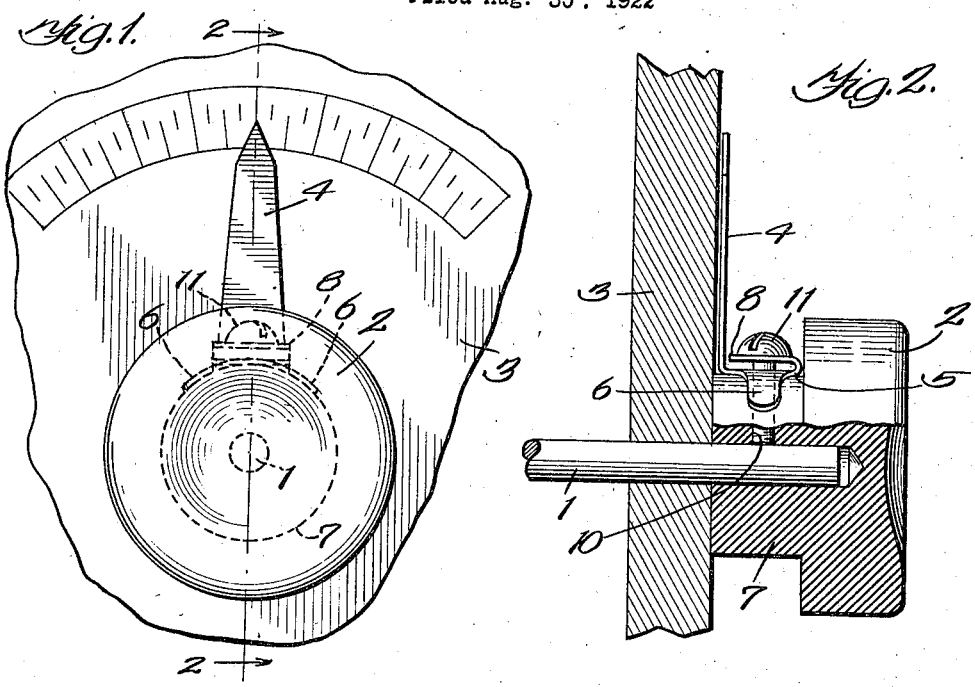
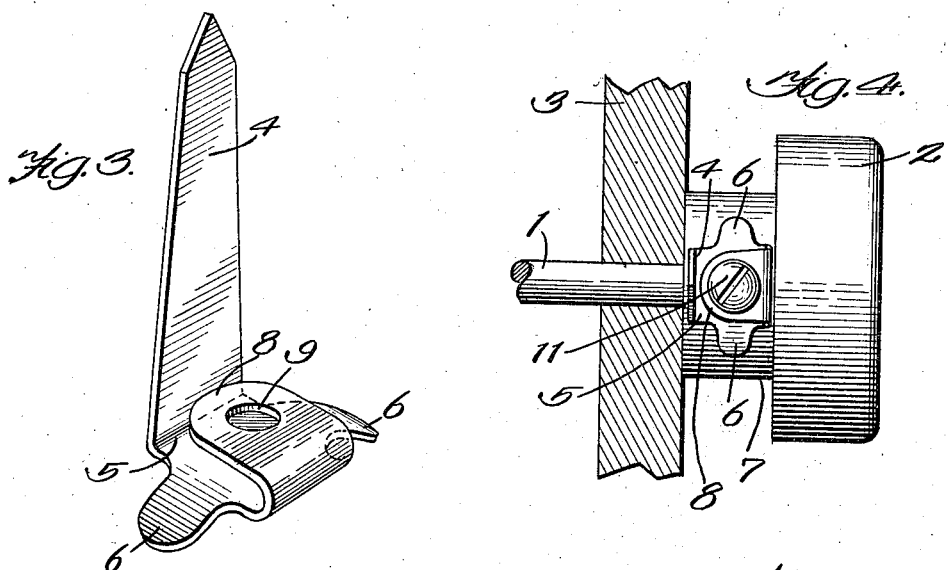
Inventor:
Peter G. Jacobson
By G. L. Gregg
Atty Patented July 31, 1923.

1,463,321

UNITED STATES PATENT OFFICE.

PETER G. JACOBSON, OF CHICAGO, ILLINOIS.

INDICATING DEVICE.

Application filed August 30, 1922. Serial No. 585,279.

*To all whom it may concern:*

Be it known that I, PETER G. JACOBSON, citizen of the United States, residing at Chicago, in the county of Cook and State of Illinois, have invented a certain new and useful Improvement in Indicating Devices, of which the following is a full, clear, concise, and exact description.

My invention relates to the mounting of arms such as the pointers of indicating devices and resides in providing such an arm with a mounting base formed of folded spring metal, this folded base being engageable by the head of a screw or other retaining element that is employed to assemble the same and its mounting, the base being thus depressible so as to yield as the screw is driven home.

When the invention is employed in an indicating device the entire arm and its base portion are formed of spring metal and the folded base of the arm is angular thereto. This folded base is desirably of U-form, the side of the fold which is contiguous to the arm proper being preferably formed with positioning ears that are curved to fit the knob or handle that is to carry the pointer. This knob is mounted upon a shaft and the retaining screw which assembles the pointer and the knob is adapted to have abutting engagement with the side of the shaft whereby one screw will serve to assemble the pointer, the knob and the shaft which carries the knob.

The invention will be more fully explained by reference to the accompanying drawing in which Fig. 1 is a front view of a portion of an indicating device including the structure of my invention; Fig. 2 is a sectional view on line 2—2 of Fig. 1; Fig. 3 is a perspective view of the preferred form of pointing arm; and Fig. 4 is a plan view of the structure with the support for the shaft shown in section.

Like parts are indicated by similar characters of reference throughout the different figures. The indicating device illustrated includes a shaft 1, which may be connected with some element that is to be adjusted, a knob 2 for turning the shaft and having a bore into which the shaft extends, a cabinet wall portion or other support 3 in which the shaft may turn and a pointing arm 4 assembled with the knob and its shaft as will be set forth. This pointing arm is preferably formed of spring metal and has its base 5 an integral continuation thereof and angular thereto. This base has ears 6 forming integral continuations thereof and curved to fit the cylindrical surface of the knob stem 7 whereby the arm is confined to a radial position.

The base 5 has a continuation 8 that is spaced apart therefrom and which forms a U-fold therewith. The free side 8 of the spring fold is formed with a screw hole 9 therethrough and there is a similar screw hole in the base 5 that is in alignment with the hole 9. A radial hole 10 is formed in the shank 7 of the knob, the holes in the spring base of the arm being alignable with the hole 10. A headed retaining element, preferably a threaded screw 11, has its shank freely passed through the holes in the base of the arm and into threaded engagement with the knob within the hole 10. The screw is in threaded engagement with the knob shank and is driven far enough to have abutting engagement with a side of the shaft. The head of the screw encounters the free side of the U-fold and depresses the same toward the shank of the knob before the shank of the screw engages the side of the shaft. The screw is driven further until it has its abutting engagement with the shaft side, the spring base of the arm yielding to permit the screw to be further driven after the base of the arm has been engaged by the screw head.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In an indicating device, the combination with a pointing arm formed of spring metal and having a base angular thereto and formed integrally therewith, this base having a continuation spaced apart from the base and forming a U-fold therewith; of a knob for carrying the pointing arm; a shaft carrying said knob; and a headed screw passing through the sides of the U-fold into holding engagement with said knob and in abutting engagement with a side of said shaft, the head of the screw engaging and pressing upon the free side of the fold.

2. The combination with an arm having a depressible base portion formed of spring metal; a mounting for the arm; a support for said mounting; and a headed screw passing through said base portion and serving to assemble said mounting and its support, the head of the screw pressing upon said base portion.

3. The combination with an arm having a depressible base portion formed of spring metal; a mounting for the arm; and a headed retaining element whose shank is passed through said base portion into assembly with said mounting and whose head presses upon said base portion.

In witness whereof, I hereunto subscribe my name this 30th day of June A. D., 1922.

PETER G. JACOBSON.